United States Patent [19]
Kato

[11] 3,865,996
[45] Feb. 11, 1975

[54] HOLOGRAPHIC AUDIO SIGNAL RECORDING AND PLAYBACK APPARATUS

[75] Inventor: Makoto Kato, Kyoto, Japan

[73] Assignee: Matsushita Electric Industrial Co., Ltd., Osaka, Japan

[22] Filed: May 8, 1972

[21] Appl. No.: 251,298

[30] Foreign Application Priority Data
May 12, 1971 Japan .................. 46-32075

[52] U.S. Cl....... 179/100.3 G, 179/100.3 R, 350/3.5
[51] Int. Cl. ........................ G11b 7/18
[58] Field of Search ............ 179/100.3 R, 100.3 G; 350/3.5; 178/6.7 R, 6.7 A; 346/108, 109

[56] References Cited

UNITED STATES PATENTS

| | | | |
|---|---|---|---|
| 1,792,766 | 2/1931 | Schroter | 274/5 R |
| 1,917,003 | 7/1933 | Williams | 179/100.41 L |
| 2,283,545 | 5/1942 | Eckert | 179/100.3 G |
| 3,453,640 | 7/1969 | Blackmer | 179/100.3 G |
| 3,545,834 | 12/1970 | Gerritsen | 350/3.5 |
| 3,623,024 | 11/1971 | Hamilton | 179/100.3 G |
| 3,632,869 | 1/1972 | Bartolini | 350/3.5 |
| 3,674,332 | 7/1972 | Kogelnik | 179/100.3 G |
| 3,716,286 | 2/1973 | St. John | 350/3.5 |
| 3,758,187 | 9/1973 | Thomas | 350/3.5 |
| 3,770,886 | 11/1973 | Kiemle | 179/100.3 G |

FOREIGN PATENTS OR APPLICATIONS

| | | | |
|---|---|---|---|
| 342,219 | 1/1931 | Great Britain | 179/100.3 G |

*Primary Examiner*—Daryl W. Cook
*Assistant Examiner*—Alan Faber
*Attorney, Agent, or Firm*—Stevens, Davis, Miller & Mosher

[57] ABSTRACT

A recording and playback apparatus for holographically recording and reproducing audio signals. In recording, the modulating element is either a vibrating mirror or an electro-optical cell. During playback, a wedged-shaped slot is positioned between the record medium and a photoelectric cell. The position of the reproduced light beam on the wedged-shaped slot is a function of the degree of modulation; thus the slot transmits an amount of light which is proportional to the recorded audio signal.

3 Claims, 6 Drawing Figures

HOLOGRAPHIC AUDIO SIGNAL RECORDING AND PLAYBACK APPARATUS

The present invention relates to an audio recording and playback apparatus. More particularly, the present invention relates to an audio recording and playback apparatus which is simple and effective when used with a recently developed system for recording and reproducing picture information represented by a motion picture, television signal or the like, such as a video playback system which employs a laser light and a hologram to record and reproduce an image.

Heretofore used systems for recording and reproducing picture information include, for example, a recently developed video recording system employing magnetic tape as a recording medium, in addition to the motion-picture film in which a photographic film having a silver salt sensitive emulsion coated thereon is used as a recording medium.

While these conventional systems have their own advantages, there are also disadvantages, such as, high cost of the recording media including photographic film, magnetic tape and the like, and in the case of the video recording difficulty in mass producing transcriptions of the recorded magnetic tape with a high picture quality and at a high speed. On the other hand, the application of such conventional systems to a video playback system designed, for example, to be connected to a color television receiver for recording and reproducing color picture and sound also involves considerable difficulties.

In an attempt to solve these drawbacks, a system utilizing the technique of holography has recently been proposed. Briefly, this system operates as follows: A picture with an encoded color signal is first recorded on a sensitive resin coated recording medium in the form of a Fraunhofer hologram. The hologram is a phase hologram of the type having the signal recorded as a pattern of irregularities on the surface of the medium, so that the original picture information can be reproduced by causing variations in the phase of a coherent light that passes through the hologram. The halogram is then plated with nickel so that when the deposited nickel is taken off from the hologram, a hologram pattern is obtained on which the irregularities are inverted. Using this pattern as a pressing die, a medium of thermoplastic material such as vinyl resin is pressed against the die under the application of heat and pressure transferring the pattern to the medium and thus obtaining a transcription of the original phase hologram.

This copying process is effected at a high speed and the material such as vinyl is extremely inexpensive compared with silver salt film and magnetic tape, thus making it possible to mass produce the transcriptions and supply them to homes at a low cost. This system also has many other advantages such as, for example, its strong resistance or immunity to the presence of dust or defects on the recording tape owing to the recording of a picture by means of a hologram. For detailed information in this respect, see for example: Electronics, pp. 108–114, McGraw-Hill, New York, USA (Nov. 10, 1969).

In this case, it is generally desired to additionally record sound on the recorded tape obtained by such video playback systems. However, as for example a method of providing a sound track such as is used on a motion-picture film so as to record an audio signal thereon in the form of an optical pattern with lights and shades, would ruin the important feature, i.e., the use of inexpensive recording tape material made possible by the utilization of the above-mentioned holographic technique.

It is therefore the primary object of the present invention to provide an audio signal recording and playback apparatus capable of recording an audio signal on the tape on which picture information is recorded, so that the reproduction of the sound is effected inexpensively and with high fidelity. The present invention thus makes it possible to supply inexpensive video playback tapes on which both picture and sound are recorded.

The above and other objects and advantages of the present invention will be readily apparent from the following detailed description of the preferred embodiments of the present invention when taken in conjunction with the accompanying drawings, in which.

Figure 1:
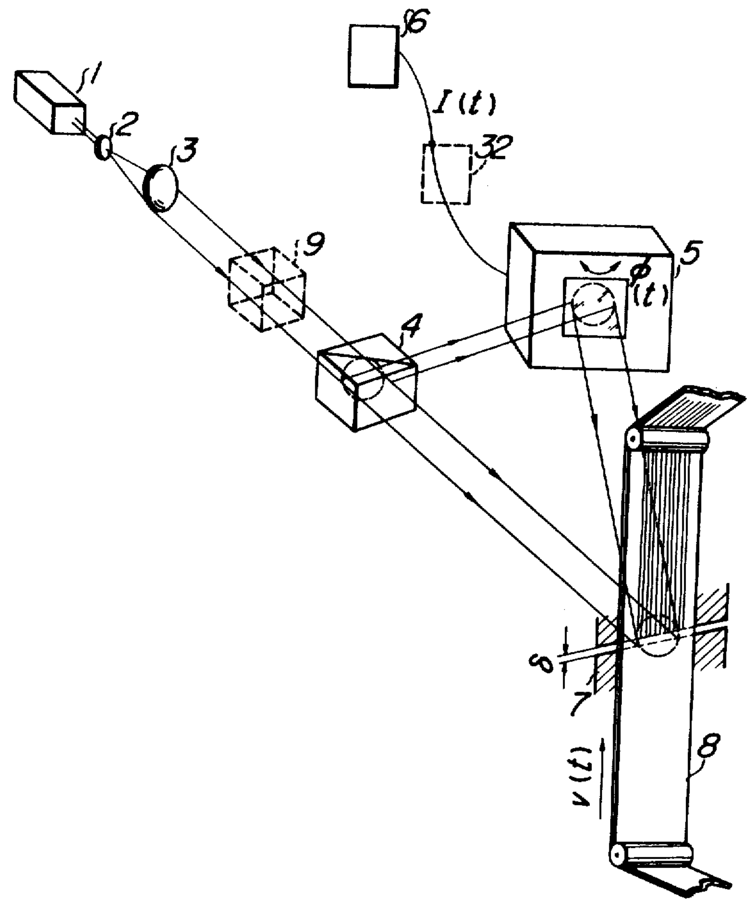
FIG. 1 is a perspective view showing the arrangement of an audio signal recording apparatus according to an embodiment of the present invention.
Figure 2:
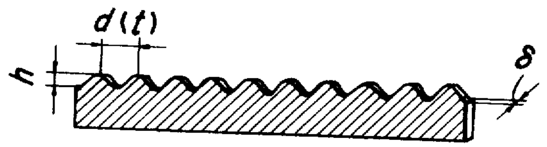
FIGS. 2 and 3 show by way of example the manner in which the recording is effected by the apparatus of FIG. 1.

Referring now to FIG. 1, there is illustrated by way of example an arrangement for recording audio signals according to the recording method of the present invention. In the figure, a light beam emitted from a source 1 of highly coherent light such as a laser is collimated by passing through lenses 2 and 3 and expanded into parallel rays of a desired size which are then split into two optical paths by a half-mirror 4. A deflection element as for example a vibration mirror 5 actuated by a galvanometer is provided in one of the optical paths, so that audio current $I(t)$ from an audio signal source 6 which is a function of the time t is converted into an angular displacement $f(t)$ of the galvanometer proportional to the input signal. A slit 7 having a width $\delta$ is located in a light blocking member at the intersection of the beam deflected by the signal in the described manner and the other one (hereinafter referred to as a reference beam) of the split beams from the half-mirror 4, and a sensitive medium such as a sensitive resin 8 movable at a constant speed $v(t)$ is provided adjacent to the back of the slit 7. The instantaneous interference fringes resulting from the two light waves superposed on one another on the sensitive resin 8 through the slit 7 are, after the necessary developing processes, recorded in the form of a one dimensional diffraction grating pattern as shown in FIG. 2. The phase of the beam of light deflected by the audio signal varies with time with respect to the wave surfaces of the reference beam. In other words, the grating interval $d(t)$ varies with the time $t$. In this case, the slit 7 need not necessarily be located adjacent to the recording medium. Instead, a slit may for example be located in the middle of each of the two optical paths so as to form an image on the recording plane through a lens system.

While the principle of recording according to the present invention has been brief, in fact, one more element must be provided in the system in order that the interference fringes may be recorded. In other words, with the recording system shown in FIG. 1, the interference fringes on the recording plane tend to move rapidly during exposure so that interference fringes having different spatial frequencies are superposed upon one another, thus making it difficult to record audio signals with high fidelity. It is possible to reduce the velocity of flow of interference fringes by means of an optical system which images the center of the mirror shown on the mirror 5 in FIG. 1 at the center of the recording plane. However, in order to make it possible to record higher frequency components with high fidelity, a light shutter 9, for example, may be inserted as shown in FIG. 1 so that the light shutter may be operated to permit light beams to pass therethrough in the form of light pulses for given short periods of time. A similar effect can be obtained by employing a pulse laser as a light source which operates at a certain repetition frequency, instead of employing the light shutter as described above. A similar effect can also be obtained by providing a modulating circuit 32 so as to actuate the vibration mirror 5 with a modulated audio signal.

Figure 3:
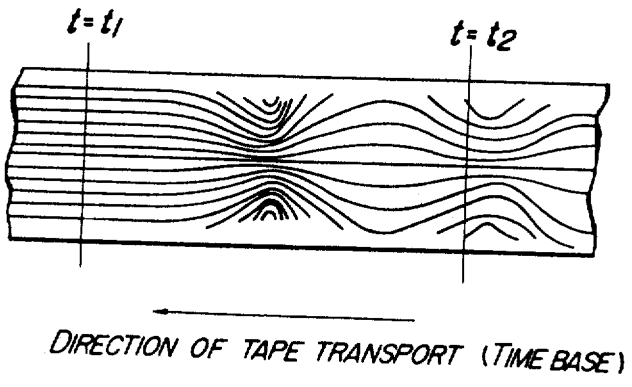

Now referring to FIG. 2, the grating interval $d(t)$ corresponds to the angular displacement $f(t)$ of the vibration mirror in FIG. 1 and the height $h$ of the ridges is a constant which does not vary if the beam intensity, sensitivity of tape, tape speed and developing conditions are fixed. FIG. 3 shows such one-dimensional diffraction grating continuously recorded on the tape. With no signal input applied, as will be seen at near the time $t = t_1$ at the left end of the tape, the grating interval does not vary with time and the spatial frequency of the grating remains unchanged. When a signal is applied, as will be seen at near the time $t = t_2$, the spatial frequency of the grating is modulated by the signal input so that the signal is recorded as the corresponding grating constants in the direction of movement of the tape, i.e., along the time axis.

Figure 4:
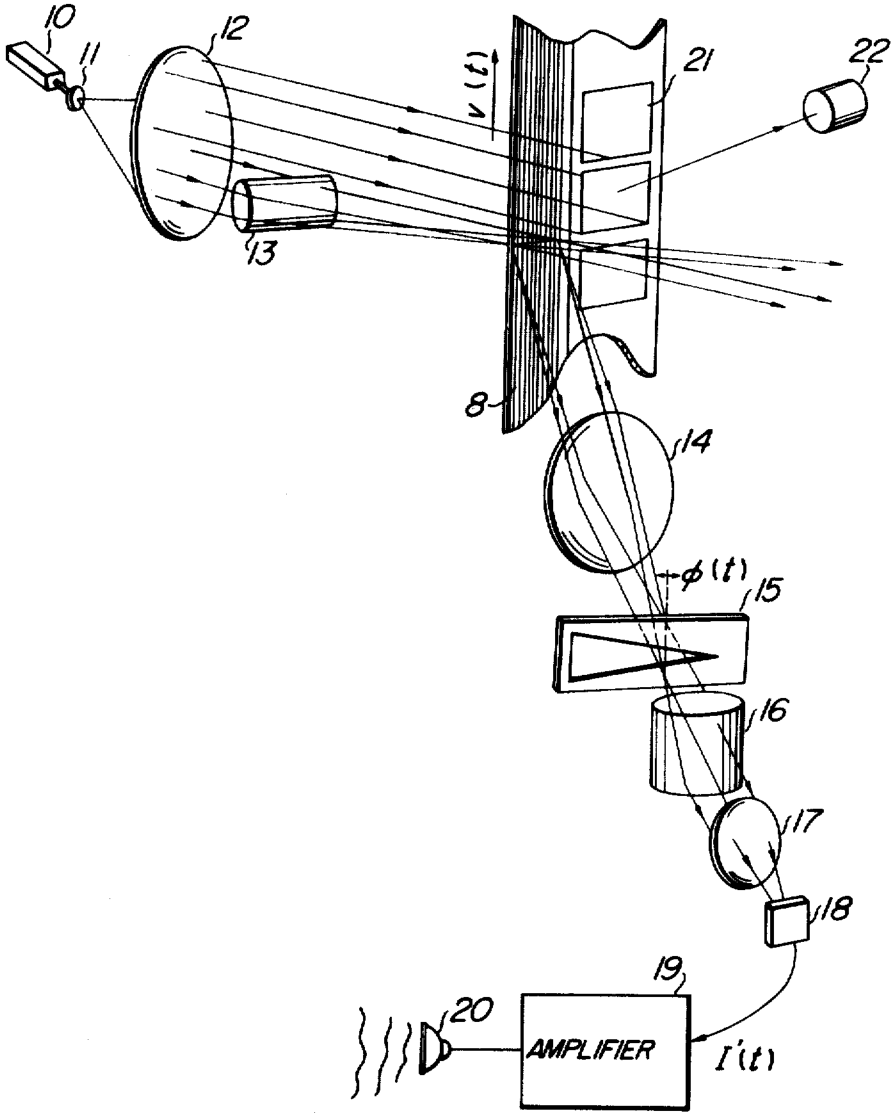
FIG. 4 is a perspective view showing the arrangement of an apparatus for reproducing the audio signal recorded on the medium by the apparatus of FIG. 1.

FIG. 4 illustrates the concept of a demodulating system for reproducing the original audio signal from the tape containing the modulated signal recorded according to the above-described method. In the figure, a portion of the coherent beam emitted from a light source 10 through lenses 11 and 12 is converged into a linear beam at the position where the slit was originally located in FIG. 1. The tape 8 is fed at a constant speed $v(t)$ and a portion of the diffracted light from the tape is converged by a convex lens 14 into a linear light beam parallel to the direction of movement of the tape on the surface of a slit 15. The slit 15 of FIG. 4 is a kind of area type special filter having a wedge shaped aperture. It is arranged such that the position of convergence of the light diffracted in the direction of smaller diffraction angles from the recorded tape is rather located near the top or right hand end of the wedge thus reducing the quantity of light passing therethrough. That is, in demodulating the phase-modulated light beam the angle of swing with respect to the optical axis varies. Thus, the amount of light transmitted through filter 15 increases as the beam is deflected to pass through the opening in the filter at the more leftward position. The position in the filter 15 at which the demodulated signal appears depends upon the degree of phase modulation. Therefore, the phase modulated light beam can be detected as a function of the change in the amount of light transmitted. An optical absorbing filter of a uniform density gradient may be employed in place of or in combination with the area type filter. With the area type filter, instead of forming its aperture into a strict wedge shape, it may be designed such that the audio signal may be reproduced with the highest possible fidelity through the whole system. Thus, as the tape is illuminated with the coherent light in the previously described manner while it is being fed at the constant speed $v(t)$, the linear beam of light moves on the slit 15 in a direction perpendicular to the direction of movement of the tape so that the vibrating motion is obtained which corresponds to the displacement $f(t)$ by the rotation of the mirror 5 in FIG. 1. The beam of light passed through the filter 15 is converged by a lens system comprising 16 and 17 and falls onto a photoelectric detector such as a photo transistor 18. By properly adjusting the position of the aperture in the filter 15, the original audio current $I(t)$ can be correctly demodulated as an output signal $I'(t) \alpha I(t)$ of the photoelectric detector. The demodulated audio signal then drives a speaker 20 through an amplifier 19.

In the reproduction process described above, it is designed such that the video signal is recorded in juxtaposition with the audio signal at a location 21 on the tape in FIG. 4 or in a spatially superposed relation, so that it is illuminated with a portion of the coherent light from the lens 12 and thus the diffracted light is directed to a video reproducing system 22 such as a vidicon which is provided in a direction different from that of the audio reproducing system.

Figures 5, 6:
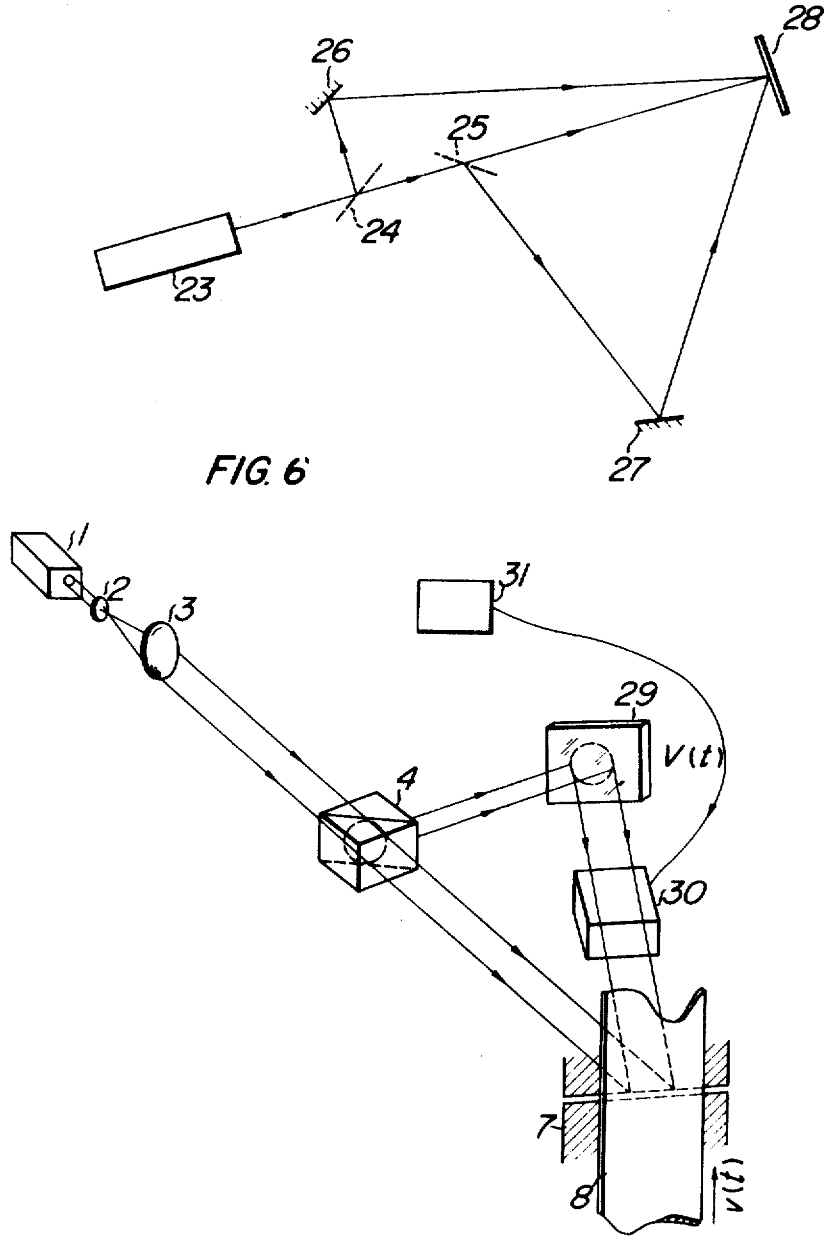
FIGS. 5 and 6 show another embodiment of the present invention.

While it has been explained that the audio signal is recorded on a single channel, as shown in FIG. 5, a beam of laser light from a light source 23 may be divided into three optical paths by means of half-mirrors 24 and 25 so that the modulated lights from two vibration mirrors 26 and 27 of the identical construction as previously explained are superposed on the reference beam on a tape 28. In this manner, two-channel recording of audio signals can be effected. In a like manner, audio signals can be recorded on three or more channels. When, however, it is necessary to arrange such that the respective signal lights cross the reference beam at different angles and in reproduction the diffracted lights are separated so as to be demodulated by means of separate filters.

It suffices to adjust the speed of the tape 8 in FIG. 1 such that the wavelength corresponding to the maximum frequency contained in the audio signal is at least more than four times the slit width $\delta$. When the signal from the audio signal source 6 is not a real time one but a reproduced signal from the magnetic tape, the running-speed of the magnetic tape can be reduced to effect the recording and thus obtain a record of improved frequency characteristics.

FIG. 6 illustrates another embodiment of the audio signal recording system according to the present invention. This embodiment differs from the embodiment of FIG. 1 in that a light modulator which modulates the amplitude of the light wave, such as, KDP which utilizes an electro-optical effect, is employed as a modulating element in place of the vibration mirror 5. In FIG. 6, the coherent light emitted from the light source is expanded through the collimator system comprising 2 and 3 and it is then divided into different optical paths through the half-mirror 4. One of the thus divided beams is reflected by a fixed mirror 29 and it is then subjected, when passing through a light modulator 30, to the amplitude modulation in accordance with an electrical signal $V(t)$ from an audio signal source 31.

The amplitude-modulated beam is then superposed on the other beam (reference beam) on the slit 7 and recorded on the recording medium 8 of a sensitive material or the like which is fed at a constant speed $v(t)$. In this case, though the spatial frequency of the recorded grating pattern is always constant and therefore the direction of diffraction does not change in the reproduction process, the recording is effected so that the diffraction efficiency of the grating is made proportional to the audio signal. This requires, however, that the height of the ridges in the phase grating to be recorded is selected to be small enough compared with the wavelength of the light so as to ensure a linear recording. In this case, what is explained with respect to the elements 9 and 32 in FIG. 1 also holds.

With the recording system described above, there is no need to use any complicated filtering in the reproducing optical system and all that is needed is to cause a portion of the diffracted light from the tape to directly impinge onto the photoelectric detector. While only one light modulator is used in the embodiment of FIG. 6, it is possible to effect the multi channel recording as previously explained.

Although the electrical signal $V(t)$ introduced into the modulator 30 has not been modulated previously in the embodiment of FIG. 6, the signal $V(t)$ itself could be subjected to any kind of modulation such as for example the FM modulation. In this case, a system can be obtained in which there is a lesser effect of nonlinearity of the light modulator and recording material.

While the two systems described above, namely, one in which the grating constants (angle of diffraction) of one-dimensional diffraction grating continuously recorded in space along the time axis are varied and the other in which the amplitude (diffraction efficiency) of a grating is varied may be used independently, it is also possible to use them simultaneously. In other words, both the grating constants and amplitude of a grating can be simultaneously modulated to record audio signal. The reproducing process is the same as explained in connection with the embodiment of FIG. 4.

It should be apparent from the foregoing that according to the present invention, audio signals can be recorded on an inexpensive material in the form of an irregular pattern, thereby making it possible to mass produce prerecorded tapes at a high speed. The number of interference fringes used as the carrier for the modulated signal can also be increased easily up to more than several thousands, so that even if several tens of the interference fringes have been completely damaged by the flaws or dust on the tape, it can only reduce the intensity of the reproduced signal by several percent or so and cannot thus directly cause noise. Such a high redundancy of the modulated signal is to meet the requirements of the video signal recording system employing holography. Since the optical systems employed in the recording and playback systems of signal patterns are not ordinary image forming systems, but they comprise interference systems of coherent light, signals can be recorded on a wide tape with high density and quality.

According to the present invention, since audio signals are recorded in the form of an interference pattern of the parallel coherent lights and the signal is recovered by detecting the diffracted components from the resultant one-dimensional grating pattern, any slow and small displacement of the running tape caused in the axial direction of the light beam or in a direction perpendicular to the direction of movement of the tape and the direction of optical axis may not give rise to any trouble and thus stable and high quality sound can always be reproduced. The feature of the present invention resides in that since only a proper regulation of the tape running speed is required in the reproduction process, a high fidelity reproduction can be effected with a simple apparatus. Furthermore, with a system of the type in which both the carrier grating constants and diffraction efficiency of a grating are simultaneously modulated, the dynamic range of sounds can be extended. In a system in which only the grating constants are modulated, the maximum diffraction efficiency can be obtained and audio signal with an improved signal-to-noise ratio can be reproduced by means of a weak light source. When it is required to record on a great number of channels, that system in which only the diffraction efficiency of a grating is modulated may be advantageously employed in consideration of the reproducing optical system.

What we claim is:

1. An audio signal recording and reproducing system comprising:

recording apparatus comprising means for generating an intermittently interrupted coherent light beam; means for splitting the beam of light from said coherent light generating means and directing one of the split coherent light beams onto a recording medium; means for phase modulating the other of said split coherent light beams with an audio electric signal; and a light blocking member including a slit having a virtually one dimensional opening through which the unmodulated one of said split light beams and the light beam modulated by said modulating means are passed coincidently to cause optical interference therebetween; and reproducing apparatus comprising means for illuminating with a coherent beam a recording medium on which audio information has been recorded, an area type filter having a wedge-shaped opening for receiving light passed through said recording medium containing said audio information, the amount of light transmitted through said filter depending upon the degree of phase modulation in the beam impinging thereon; photoelectric converting means for receiving light from said filter, said photoelectric converting means converting the light from said filter to an audio signal corresponding to the audio electric signal used for modulating the other of said split coherent light beams; and electroacoustic transducer means for converting the output of said photoelectric converting means to said audio signal.

2. An audio signal recording and reproducing apparatus as defined by claim 1 wherein said means for generating an intermittently interrupted coherent light beam comprises a laser operating at a predetermined repetition frequency.

3. An audio signal recording and reproducing apparatus as defined by claim 1 wherein said means for generating an intermittently interrupted coherent light beam comprises a laser and a light shutter, said light shutter being interposed between said laser and said beam splitting means.

* * * * *